(12) United States Patent
Kepplinger et al.

(10) Patent No.: US 6,241,801 B1
(45) Date of Patent: Jun. 5, 2001

(54) METHOD FOR TREATING PARTICULATE MATERIAL IN THE FLUIDIZED BED METHOD AND VESSEL AND PLANT FOR CARRYING OUT THE METHOD

(75) Inventors: Werner Leopold Kepplinger, Leonding; Felix Wallner; Johannes-Leopold Schenk, both of Link; Franz Hauzenberger, St. Marien, all of (AT); Il-Ock Lee, Pohang (KR)

(73) Assignees: Voest-Alpine Industrieanlagenbau GmbH, Linz (AT); Pohang Iron & Steel Co., Ltd.; Research Institute of Industrial Science & Technology, Incorporated Foundation, both of (KR)

( * ) Notice: Subject to any disclaimer, the term of this patent is extended or adjusted under 35 U.S.C. 154(b) by 0 days.

(21) Appl. No.: 09/193,544

(22) Filed: Nov. 17, 1998

Related U.S. Application Data

(63) Continuation-in-part of application No. PCT/AT97/00098, filed on May 15, 1997.

(30) Foreign Application Priority Data

May 17, 1996 (AT) .................................................. A875/96

(51) Int. Cl.⁷ ............................................................ C22B 5/14
(52) U.S. Cl. ................................. 75/414; 75/444; 75/446; 266/172
(58) Field of Search ........................... 75/414, 444, 446; 266/172

(56) References Cited

U.S. PATENT DOCUMENTS

| | | | |
|---|---|---|---|
| 2,909,423 | 10/1959 | Jukkola | 75/26 |
| 5,330,556 | * 7/1994 | Hardie et al. | 75/444 |
| 5,338,336 | 8/1994 | Greenwalt | 75/445 |
| 5,407,179 | 4/1995 | Whipp | 266/142 |

FOREIGN PATENT DOCUMENTS

| | | |
|---|---|---|
| 0022098 | 1/1981 | (EP) . |
| 0571358 | 11/1993 | (EP) . |
| 1101199 | 1/1968 | (GB) . |
| 92/02458 | 2/1992 | (WO) . |
| 96/10094 | 4/1996 | (WO) . |
| 97/13880 | 4/1997 | (WO) . |

* cited by examiner

*Primary Examiner*—Melvyn Andrews
(74) *Attorney, Agent, or Firm*—Ostrolenk, Faber, Gerb & Soffen, LLP

(57) ABSTRACT

In a method for treating particulate material in the fluidized bed method, the particulate material is maintained in a fluidized bed by a treating gas flowing from bottom to top and thereby is treated. To minimize the consumption of treating gas and to reduce entrainment of fine particles by the treating gas, a particulate material having a wide grain distribution and a relatively high portion of fines is used for treatment and the treating gas in the fluidized bed is maintained at a superficial velocity less than the velocity required for fluidizing the largest particles of said particulate material.

10 Claims, 3 Drawing Sheets

Figure 1:
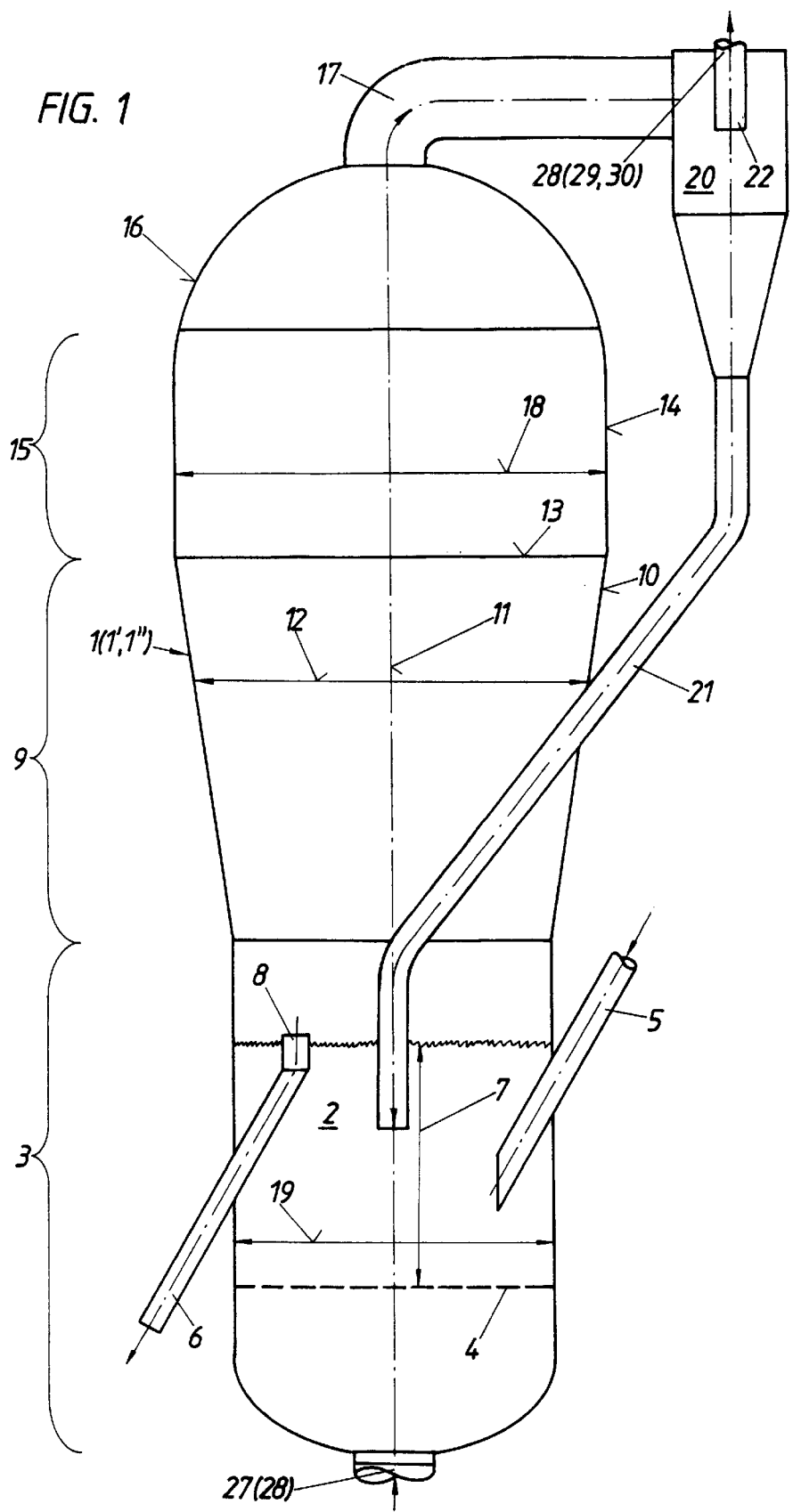

METHOD FOR TREATING PARTICULATE MATERIAL IN THE FLUIDIZED BED METHOD AND VESSEL AND PLANT FOR CARRYING OUT THE METHOD

CROSS-REFERENCE TO RELATED APPLICATIONS

This is a continuation-in-part of International Application PCT/AT97/00098, with an International filing date of May 15, 1997.

The invention relates to a method for treating, preferably reducing, particulate material in the fluidized bed method, in particular for reducing fine ore, wherein said particulate material is maintained in a fluidized bed by a treating gas flowing from bottom to top and thereby is treated, and a vessel for carrying out the method.

A method of this kind is known f.i. from U.S. Pat. No. 2,909,423, WO 92/02458 and EP-A -0 571 358. In this method, oxide-containing material, f.i. fine ore, is reduced in a fluidized bed maintained by a reducing gas inside a fluidized-bed reduction reactor, with the reducing gas, which via a nozzle grate is fed into the fluidized-bed reduction reactor, flowing through the reduction reactor from the bottom toward the top, whereas the oxide-containing material permeates the reduction reactor roughly cross-current to the reducing-gas stream. In order to maintain the fluidized bed, a specific velocity of the reducing gas inside the fluidized bed zone is required which is a function of the particle size of the charged material.

Due to the relatively high velocity of the reducing gas which is necessary with the known methods there is a substantial discharge of superfines of the oxide-containing material as well as at an advanced stage of the reduction process a discharge of already reduced oxide-containing material from the fluidized bed, said superfines being then contained in the reducing gas. To remove said superfines from the reducing gas—on the one hand in order to be able to further utilize the partially oxidized reducing gas, f.i. for precedingly arranged reduction reactors, or for the recovery of the oxide-containing material or the already reduced material which otherwise would be lost—the reducing gas containing the superfines is conducted through dust separators, such as cyclones, and the separated dust is recycled back into the fluidized bed. The dust separators or cyclones respectively are preferably arranged inside the reactors (cf. U.S. Pat. No. 2,909,423); but they can also be installed outside of the reactors.

In practice it has emerged that partially reduced or completely reduced fine-grained particles of the oxide-containing material tend to stick or cake to each other and/or to the walls of the reactors or cyclones and to the connection ducts or conveying ducts. This phenomenon is referred to as "sticking" or "fouling". Sticking or fouling are functions of the temperature and the degree of reduction of the oxide-containing material. Such sticking or attachment of the partly or completely reduced oxide-containing material to the walls of the reduction reactors or to other parts of the plant may cause failures, so that it is not feasible to operate the plant continuously over a prolonged time period without any shut-down. It has been found that continuous operation for more than a year is hardly possible.

Removal of the attachments or cakings requires a huge amount of work and entrains substantial costs, namely labor costs and costs arising due to the production loss of the plant. Often, these attachments will detach spontaneously, as a result of which they either drop into the fluidized bed and thus lead to a disturbance of the reduction process, or—if the attachments detach themselves from the cyclone—cause the dust recycling channels that lead from the cyclone to the fluidized bed to become plugged, so that further separation of dust from the reducing gas will be completely impossible.

In practice, one disadvantage with the known fluidized bed methods resides in the inflexibility and difficulties encountered in splitting up and feeding in the treating-gas stream, i.e. with the above-described prior-art processes this would be the splitting up and feeding in of the reducing-gas stream. A further disadvantage associated with the prior art is that in each process stage, that is in pre-heating, pre-reduction and final reduction, in most cases two or several product streams leaving the apparatuses allocated to the process stages have to be sluiced out, thus causing substantial expenses in terms of conveying and sluice means. Moreover, two gas supply systems have to be adjusted in each process stage, which in practice presents major difficulties in the case of hot dust-containing gases.

In addition to this, due to the relatively high velocity of the reducing gas there is a substantial consumption of reducing gas. Considerably more reducing gas is consumed than would be necessary for the reduction process as such, with the excess consumption merely serving to keep up the fluidized bed.

A process for reducing metal ores by a fluidized bed method is also known from GB-A -1 101 199. Here, the process conditions have been chosen such that the material will cake together in the course of the reduction process, whereby agglomerates are formed which, due to their size, are not fluidized. Thereby it is feasible to separate the completely reduced material, which is discharged from the fluidized bed reactor in the downward direction, from the not completely reduced material, which remains fluidized. Smaller product particles are withdrawn at the upper end of the fluidized bed. Thus with this process there likewise result two product streams, necessitating considerable expenses in terms of apparatus.

The invention aims at avoiding these disadvantages and difficulties and has as its object to provide a method of the initially described kind and a vessel for carrying out the method, which enable treatment of particulate oxide-containing material at minimum consumption of treating gas over a substantial tine period without the danger of failures caused by sticking or fouling. In particular, it is to be feasible to reduce both the amount of the treating gas required for maintaining the fluidized bed and the flow rate of the same, so that there will only be a minimum discharge of fine particles.

In accordance with the invention, this object is achieved in that a particulate material having a wide grain distribution containing a relatively high portion of fines and a portion of larger particles is used for treatment and that the superficial velocity of the treating gas in the fluidized bed is kept to be smaller than the velocity required for fluidizing the portion of larger particles of said particulate material, wherein all of the larger particles together with the fines are moved upward and discharged from the upper region of the fluidized bed.

It has become apparent that in case of a wide even grain distribution the superficial velocity in the fluidized bed is maintained within a range of 0.25 to 0.75 of the velocity required for fluidizing the largest particles of said particulate material.

Preferably, a particulate material with a grain having a medium grain diameter of the grain band of 0.02 to 0.15, preferably 0.05 to 0.10, of the largest grain diameter of said particulate material is used.

Herein, suitably, for the treating gas above the fluidized bed a superficial velocity relative to the largest diameter of a vessel designated for receiving the fluidized bed is adjusted for a theoretic cut grain size of 50 to 150 µm, preferably 60 to 100 µm, wherein advantageously in the fluidized bed a superficial velocity ranging between 0.3 m/s and 2.0 m/s is adjusted for reducing run-of-mine fine ores.

A method for producing molten pig iron or liquid steel pre-products from charging substances formed of iron ores and fluxes and at least partially comprising fines utilizing the treating method according to the invention is characterized in that the charging substances are directly reduced to sponge iron in at least one reduction zone by the fluidized bed method, the sponge iron is melted in a melting-gasifying zone under the supply of carbon carriers and oxygen-containing gas, and a CO and $H_2$-containing reducing gas is produced which is injected into the reduction zone, is reacted there, is withdrawn as an export gas and is supplied to a consumer.

A vessel for carrying out the method in accordance with the invention is characterized by the combination of the following characteristic features:

- a cylindrical lower fluidized bed section receiving the fluidized bed and including a gas distributing bottom, a feed duct for the treating gas, and a supply means and a discharge means for particulate material provided above the gas distributing bottom,
- a cone-shaped section arranged above the fluidized bed section so as to follow upon the same and widening conically upwards, the inclination of the wall of the cone-shaped section relative to the central axis of the reactor amounting to 6° to 15°, preferably 8° to 10°,
- an at least partially cylindrical calming section following upon the cone-shaped section and closed on top, from which a treating-gas discharge duct departs,
- the ratio of the cross sectional area of the calming section in the cylindrical region to the cross sectional area of the fluidized bed section being $\geq 2$.

A vessel for carrying out an ore reduction method in a fluidized bed, said vessel comprising two cylindrical parts of different diameters and a very short and markedly cone-shaped part provided between the cylindrical parts, is f.i. known from EP-A -0 022 098. However, with this vessel there are provided two gas supply ducts, namely one below the lower cylindrical part and one in the cone-shaped part. The completely reduced ore is discharged from this fluidized bed reactor in the downward direction.

Preferably, in accordance with the invention the cross sectional area of the calming space in the cylindrical region is large enough for a superficial velocity adjusting in this region that would be sufficient for separating from the gas a grain having a grain size of above 50 µm.

A plant for producing molten pig iron or liquid steel pre-products from charging substances formed of iron ores and fluxes and at least partially comprising fines is characterized by at least one vessel according to the invention constructed as a reduction reactor into which a conveying duct for charging substances containing iron ore and fluxes, a gas duct for a reducing gas as well as a conveying duct for the reduction product formed therein and a gas duct for the top gas enter, and is provided with a melter gasifier into which the conveying duct conducting the reduction product from the reduction reactor enters and which includes feed ducts for oxygen-containing gases and carbon carriers as well as a tap for pig iron or steel pre-material and slag, wherein the gas duct entering into the reduction reactor and serving for reducing gas formed in the melter gasifier departs from the melter gasifier and the reduction reactor is constructed as a fluidized bed reduction reactor.

Figure 2:
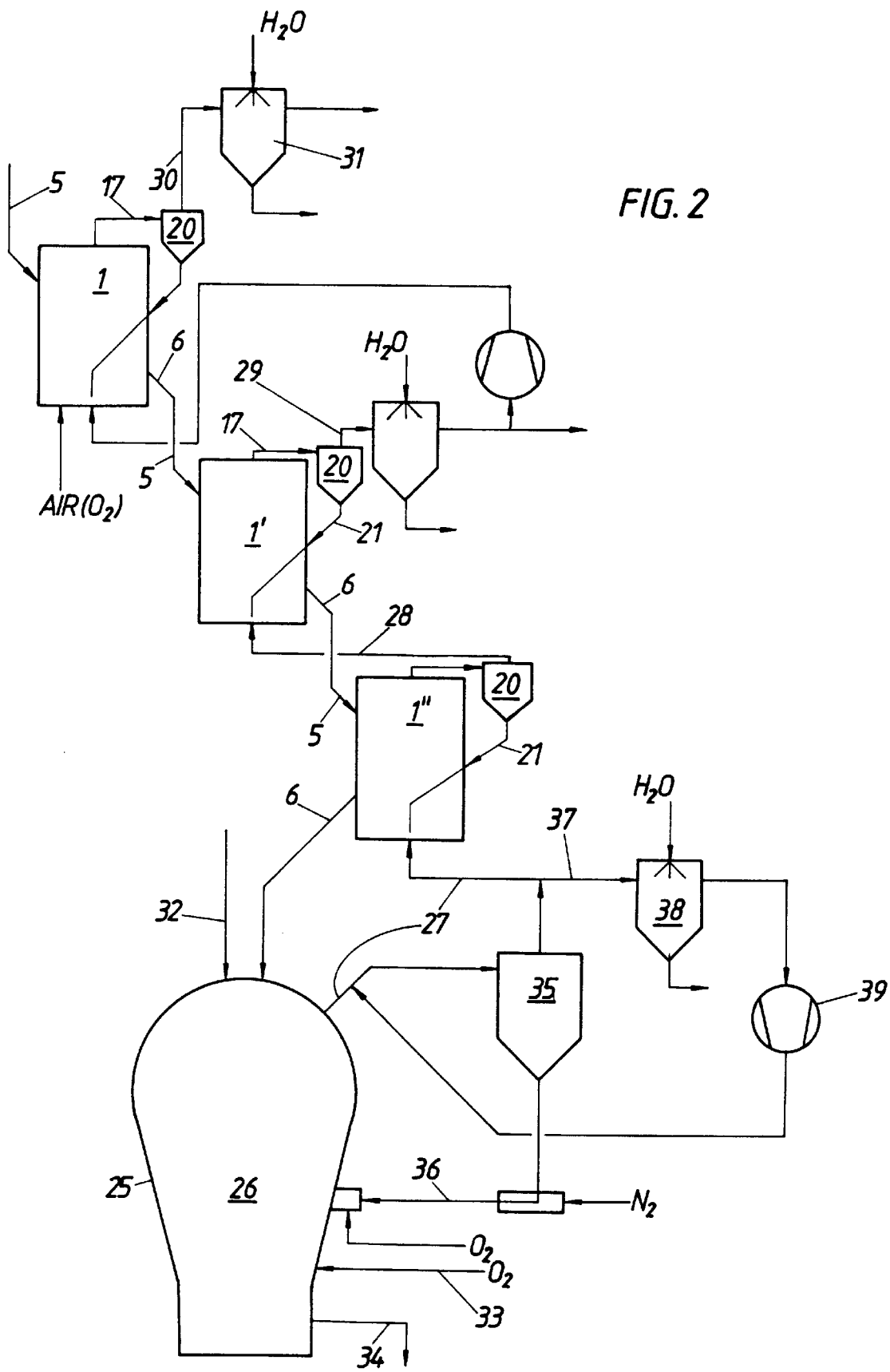
Figure 3:
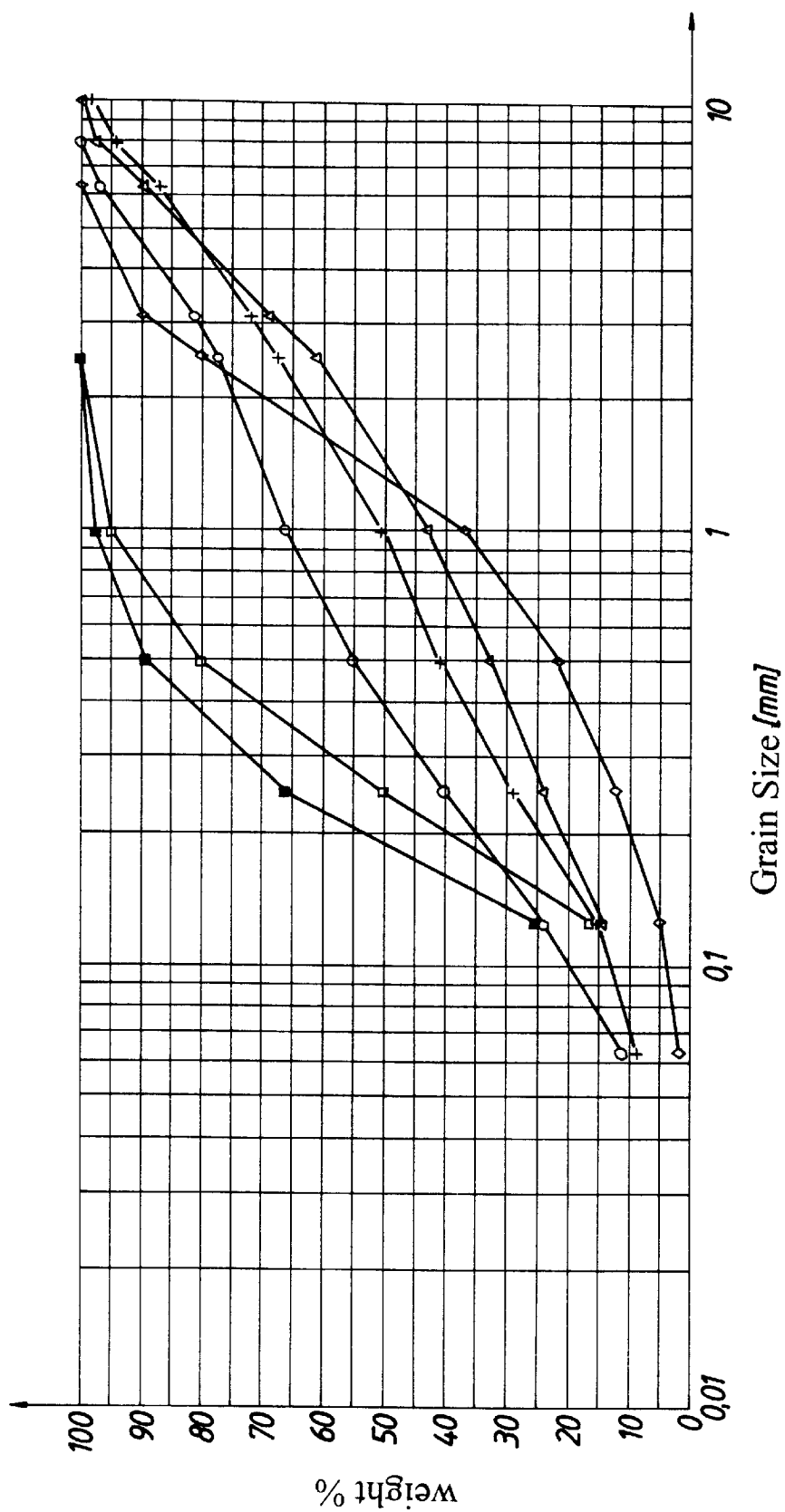

In the following, the invention is described in greater detail with reference to the drawing, FIG. 1 showing a sectional view of a vessel according to the invention and FIG. 2 a process diagram for the reduction of iron ore wherein vessels according to the invention can be utilized. FIG. 3 illustrates in diagrammatic form some grain size distributions of iron ores to be treated in accordance with the invention.

Vessel 1 which is represented in FIG. 1 and constitutes a fluidized bed reactor, in particular a reduction reactor, comprises a cylindrical lower fluidized bed section 3 which is destined to receive a fluidized bed 2 and at a specific height level is provided with a gas distributing bottom constructed as a nozzle grate 4, for feeding and evenly distributing the reducing gas. The reducing gas flows through the reduction reactor starting from the nozzle grate 4, from the bottom toward the top. Above the nozzle grate 4 and still within the cylindrical fluidized bed section 3 there discharge conveying ducts 5, 6, namely feed ducts and discharge ducts for the fine ore. The fluidized bed 2 exhibits a bed height 7 from the nozzle grate 4 up to the level of the discharge duct 6 for the fine ore, i.e. its opening 8.

To the cylindrical fluidized bed section 3 there is connected an upwardly flared cone-shaped section 9, the inclination of the wall 10 of this cone-shaped portion 9 to the reactor central axis 11 amounting to maximally 6 to 15°, preferably 8 to 100. In this area the continuous increase in the cross section 12 of the cone-shaped section 9 causes a steadily and continuously increasing reduction in the superficial velocity of the upward-streaming reducing gas.

Due to the only slight inclination of the wall 10 of the cone-shaped section 9 it is feasible in spite of the enlargement of the cross section 12 to obtain in said cone-shaped section 9 a current without turbulence and without separation from the wall 10. Turbulence, which would cause a localized increase in the velocity of the reducing gas, is hereby avoided. Thereby an even and continuous reduction in the superficial velocity of the reducing gas across the cross section 12 is ensured throughout the entire height of the cone-shaped section 9, i.e. at every level of the same.

To the upper end 13 of the cone-shaped section 9 there is connected a calming section 15 which is provided with a cylindrical wall 14 and which at the top is closed by means of a reactor ceiling 16 constructed in the shape of a partial sphere, f.i. of a hemisphere. A gas duct 17 for discharging the reducing gas is arranged centrally in the reactor ceiling 16. The enlargement of the cross-sectional space of the cone-shaped section 9 is designed such that the ratio of the cross-sectional area 18 of the calming section 15 to the cross-sectional area 19 of the fluidized bed section 3 is $\geq 2$.

The gas duct 17 leads to a cyclone 20 serving for the dust separation of the reducing gas. A dust recirculating duct 21 departing from the cyclone 20 is directed downward and opens into the fluidized bed 2. The gas discharge of the cyclone 20 is designated by the reference numeral 22.

In accordance with the invention, fine ore having a wide even grain distribution comprising a relatively high portion of fines is processed in the reduction reactor 1. An example of a grain distribution of this type could f.i. be as follows:

|  | mass fraction |
| --- | --- |
| up to 4 mm | 100% |
| up to 1 mm | 72% |
| up to 0.5 mm | 55% |
| up to 0.125 mm | 33% |

It has been found that a fine ore of roughly the above grain distribution can be fluidized without incurring a segregation in the fluidized bed 2, wherein, and this is essential for the invention, the superficial velocity $v_{super}$ is at all times lower than the minimum fluidizing velocity for the largest particles of the fine ore.

The following ratio has been found to be the optimum operating range for $v_{super}$:

$v_{super}$=0.25 to 0.75 .$v_{min}(d_{max})$ $v_{super}$ - superficial velocity in the fluidized bed 2 above the distributing bottom 4

$v_{min}(d_{max})$ - minimum fluidizing velocity of the largest particle of the charged fraction As already mentioned above, a wide grain distribution of the fine ore is essential for the invention. Such a grain distribution is a feature of run-of-mine fine ores, i.e. of fine ores which are not subjected to screening after size reduction. Some examples of grain distributions of run-of-mine iron ores are given in FIG. 3. With these grain distributions of run-of-mine iron ores there is always a larger portion of a fine fraction present which is so small that it does not stay in the fluidized bed but is discharged along with the gas and recycled back via the cyclones. The fine fraction is necessary to ensure the fluidization of the very large particles at merely a relatively low superficial velocity of the treating gas.

In accordance with the invention one exploits the effect that with a wide grain distribution a pulse transmission of the pulse of the particles to the larger particles takes place. Hereby it is feasible to fluidize large particles, even if the superficial velocity of the reducing gas is below the superficial velocity required for the large particles. In accordance with the invention it is feasible to utilize a fine ore of natural grain distribution (run-of-mine) without any previous screening, exhibiting a $d_{max}$ of preferably up to 12 mm, maximally up to 16 mm.

By utilizing the reduction reactor designed in accordance with the criteria set forth above, and by utilizing fine ore having a relatively high portion of fines, the following advantages are obtained with respect to the fluidization behavior:

a flexible system, in view of the changes in solids density and grain size distribution associated with changing raw material charges insensitivity to disintegration of grains and thus to changes in the portion of fines incurring between the feed-material stream and the product stream.

The vessel 1 can with equal advantages be utilized as a preheating vessel and as a prereduction and final reduction vessel.

A plant in which a vessel 1 of the type described above, constructed in accordance with the invention, is employed to advantage, is described below in greater detail with reference to the schematic FIG. 2:

A plant for producing pig iron or steel pre-products comprises three fluidized bed reactors 1, 1', 1" of the construction set forth above and subsequently connected in series, wherein iron-oxide-containing material, such as run-of-mine fine ore, via an ore feed duct 5 is conducted to the first fluidized bed reactor 1 in which in a preheating stage preheating of the fine ore and optionally pre-reduction takes place and subsequently is conducted from fluidized bed reactor 1 to fluidized bed reactor 1' or 1' to 1" respectively via conveying ducts 5, 6. In the second fluidized bed reactor 1' pre-reduction takes place in a pre-reduction stage and in the subsequently arranged fluidized bed reactor 1" a final reduction of the fine ore to sponge iron in a final reduction stage.

The completely reduced material, i.e. the sponge iron, via a conveying duct 6 is conducted into a melter gasifier 25. In a melt-down gasifying zone 26 inside the melter gasifier 25, from coal and oxygen-containing gas a CO- and $H_2$-containing reducing gas is produced which via the reducing-gas feed duct 27 is fed into the fluidized bed reactor 1" arranged last in the direction of flow of the fine ore. In counterflow to the ore flow, the reducing gas is then conducted from fluidized bed reactor 1" to fluidized bed reactor 1' or from 1' to 1 respectively, namely via the connection ducts 28, 29, is carried out of the fluidized bed reactor 1 as a topgas via a top-gas discharge duct 30 and is subsequently cooled and scrubbed in a wet scrubber 31.

The melter gasifier 25 is provided with a feed duct 32 for solid carbon carriers, a feed duct 33 for oxygen-containing gases as well as optionally feed ducts for carbon carriers, such as hydrocarbons, that are liquid or gaseous at room temperature as well as for calcined fluxes. Inside the melter gasifier 25, molten pig iron or molten steel prematerial and molten slag collect below the melt-down gasifying zone 26, which are tapped off through a tap 34.

Inside the reducing-gas feed duct 27 which departs from the melter gasifier 25 and opens into the fluidized bed reactor there is provided a dedusting means, such as a hot gas cyclone 35, the dust particles separated in this hot gas cyclone 35 being supplied to the melter gasifier 25 via the return duct 36, using nitrogen as the conveying means and passing through a burner under the blowing of oxygen.

A possibility for adjusting the temperature of the reducing gas arises due to the gas recycling duct 37, which is preferably provided and which departs from the reducing-gas feed duct 27 and recycles back a portion of the reducing gas into said reducing-gas feed duct 27 via a scrubber 38 and a compressor 39, namely at a position upstream of the hot gas cyclone 35.

What is claimed is:

1. A method for treating particulate material in the fluidized bed method, wherein said particulate material is maintained in a fluidized bed (2) by a treating gas flowing from bottom to top and thereby is treated, characterized in that a particulate material having a wide grain distribution containing a relatively high portion of fines and a portion of larger particles is employed and that the treating gas in the fluidized bed (2) is maintained at a superficial velocity less than the velocity required for fluidizing the portion of larger particles of said particulate material, wherein all of the larger particles together with the fines are moved upward and discharged from the upper region of the fluidized bed.

2. A method according to claim 1, characterized in that the superficial velocity in the fluidized bed (2) is maintained within a range of 0.25 to 0.75 of the velocity required for fluidizing the largest particles of said particulate material.

3. A method according to claim 1, characterized in that a particulate material with a grain having a medium grain diameter of the grain band of 0.02 to 0.15 of the largest grain diameter of said particulate material is used.

4. A method according to claim 1, said treating being for reducing fine ore.

5. A method according to claim 1, wherein a particulate material with a grain having a medium grain diameter of the grain band of 0.05 to 0.10 of the largest grain diameter of said particulate material is used.

6. A method for producing molten pig iron or liquid steel pre-products from charging substances formed of iron ores and fluxes and at least partially comprising fines, wherein the charging substances are directly reduced to sponge iron in at least one reduction zone by the fluidized bed method according to claim 1, the sponge iron is melted in a melting-gasifying zone under supply of carbon carriers and oxygen-containing gas, and a CO and $H_2$-containing reducing gas is produced, which is injected into the reduction zone, is reacted there, is withdrawn as an export gas and is supplied to a consumer.

7. A plant for producing molten pig iron or liquid steel pre-products, comprising at least one vessel constructed as a reduction reactor (1, 1', 1") into which a conveying duct (5) for charging substances containing iron ore and fluxes, a gas duct (27, 28) for a reducing gas as well as a conveying duct (6) for the reduction product formed therein and a gas duct (30) for the top gas enter, and comprising a melter gasifier (25) into which the conveying duct (6) conducting the reduction product from the reduction reactor (1, 1', 1") enters and which includes feed ducts (32, 33) for oxygen-containing gases and carbon carriers as well as a tap (34) for pig iron or steel pre-material and slag, wherein the gas duct (27) entering into the reduction reactor (1, 1', 1") and serving for reducing gas formed in the melter gasifier (25) departs from the melter gasifier (25) and the reduction reactor is constructed as a fluidized bed reduction reactor (1, 1', 1"), for carrying out the method according to claim 6.

8. A vessel having in combination:
(a) means for maintaining in a fluidized bed particulate material having a wide grain size distribution with a high proportion of fines and a portion of larger particles;
(b) means for passing treating gas from the bottom to the top of said fluidized bed;
(c) means for maintaining the superficial velocity of said treating gas below the velocity needed to fluidize said larger particles; and
(d) means for withdrawing the particulate material from the upper region of the fluidized bed.

9. A vessel according to claim 8 having in combination:
a cylindrical lower fluidized bed section (3) receiving the fluidized bed (2) and including a gas distributing bottom (4), a feed duct (27, 28) for the treating gas, and a supply means and a discharge means for particulate material provided above the gas distributing bottom (4), a cone-shaped section (9) arranged above the fluidized bed section (3) so as to follow upon the same and widening conically upwards, the inclination of the wall (10) of the cone-shaped section (9) relative to the central axis (11) of the reactor amounting to 6° to 15°, an at least partially cylindrical calming section (15) following upon the cone-shaped section (9) and closed on top, from which a treating-gas discharge duct (28, 29, 30) departs, the ratio of the cross sectional area (18) of the calming section (15) in the cylindrical region to the cross sectional area (19) of the fluidized bed section (3) being $\geq 2$.

10. A vessel according to claim 9, characterized in that the cross sectional area (18) of the calming space (15) of the vessel in the cylindrical region is large enough for a superficial velocity adjusting in this region that would be sufficient for separating from the gas a grain having a grain size of above 50 $\mu$m.

* * * * *